United States Patent
Gu et al.

(10) Patent No.: US 12,111,413 B2
(45) Date of Patent: Oct. 8, 2024

(54) MULTI-CHANNEL JOINT INTERFERENCE MITIGATION

(71) Applicant: Aptiv Technologies AG, Schaffhausen (CH)

(72) Inventors: Yujie Gu, Calabasas, CA (US); Zhengzheng Li, Agoura Hills, CA (US)

(73) Assignee: Aptiv Technologies AG, Schaffhausen (CH)

( * ) Notice: Subject to any disclaimer, the term of this patent is extended or adjusted under 35 U.S.C. 154(b) by 387 days.

(21) Appl. No.: 17/652,634

(22) Filed: Feb. 25, 2022

(65) Prior Publication Data

US 2023/0176177 A1 Jun. 8, 2023

Related U.S. Application Data (60) Provisional application No. 63/265,030, filed on Dec. 6, 2021.

(51) Int. Cl.
*G01S 7/02* (2006.01)
*G01S 13/931* (2020.01)

(52) U.S. Cl.
CPC ........... *G01S 7/0236* (2021.05); *G01S 13/931* (2013.01)

(58) Field of Classification Search
CPC .............................. G01S 7/0236; G01S 13/931
See application file for complete search history.

(56) References Cited

U.S. PATENT DOCUMENTS

| | | |
|---|---|---|
| 2010/0019950 A1 | 1/2010 | Yamano et al. |
| 2013/0342381 A1 | 12/2013 | Nakagawa et al. |

(Continued)

FOREIGN PATENT DOCUMENTS

| | | |
|---|---|---|
| EP | 3244229 A1 | 11/2017 |
| EP | 3828585 A1 * | 11/2019 |

(Continued)

OTHER PUBLICATIONS

H. Subbaram and K. Abend, "Interference suppression via orthogonal projections: a performance analysis," in IEEE Transactions on Antennas and Propagation, vol. 41, No. 9, pp. 1187-1194, Sep. 1993 (Year: 1993).*

(Continued)

*Primary Examiner* — Peter M Bythrow
*Assistant Examiner* — Nazra Nur Waheed
(74) *Attorney, Agent, or Firm* — Harness, Dickey & Pierce, P.L.C.

(57) ABSTRACT

This document describes techniques, apparatuses, and systems for multi-channel joint interference mitigation. Radar radiation received by a radar system may include interference from other nearby radar systems. The interference can result in reduced sensitivity of the radar system. The techniques, apparatuses, and systems described herein mitigate the interference by identifying a set of samples of the radar radiation with interference. The interference can be estimated and mitigated by comparing this set (e.g., with interference) to a set of samples without interference and suppressing the interference without suppressing the detected signal. Further, the interference can be analyzed to determine if the interference contains detection information of one or more objects (e.g., other vehicles with radar systems causing interference). In this manner, interference mitigation may be obtained without losing information included in the set of samples including interference.

20 Claims, 5 Drawing Sheets

(56) References Cited

U.S. PATENT DOCUMENTS

| | | | |
|---|---|---|---|
| 2013/0342383 A1* | 12/2013 | Kojima | G01S 13/28 |
| | | | 342/134 |
| 2016/0341814 A1* | 11/2016 | Nguyen | H04L 25/03305 |
| 2017/0059691 A1 | 3/2017 | Fischer | |
| 2019/0317187 A1 | 10/2019 | Meissner et al. | |
| 2020/0292660 A1 | 9/2020 | Meissner et al. | |

FOREIGN PATENT DOCUMENTS

| | | |
|---|---|---|
| EP | 3637127 A1 | 4/2020 |
| EP | 3770628 A1 | 1/2021 |
| WO | 2019159112 A1 | 8/2019 |

OTHER PUBLICATIONS

"Extended European Search Report", EP Application No. 22167526.7, Oct. 17, 2022, 18 pages.
"Extended European Search Report", EP Application No. 22197774.7, Mar. 31, 2023, 13 pages.
Brooker, "Mutual Interference of Millimeter-Wave Radar Systems", Feb. 2007, pp. 170-181.
Toth, et al., "Performance Comparison of Mutual Automotive Radar Interference Mitigation Algorithms", Apr. 2019, 6 pages.
TULLSSON, "Topics in FMCW radar disturbance suppression", Oct. 1997, 5 pages
Alhumaidi, et al., "Interference Avoidance and Mitigation in Automotive Radar", Jan. 2021, pp. 172-175.

* cited by examiner

MULTI-CHANNEL JOINT INTERFERENCE MITIGATION

CROSS-REFERENCE TO RELATED APPLICATION

This application claims the benefit of U.S. Provisional Patent Application No. 63/265,030, filed Dec. 6, 2021, the disclosure of which is hereby incorporated by reference in its entirety herein.

BACKGROUND

Radar systems can provide range, velocity, azimuth, and elevation angle information of objects in the surrounding environment of vehicles equipped with perception systems, including autonomous or semi-autonomous driving systems. The object information is used to provide features such as adaptive cruise control, lane-centering, lane-change assist, and emergency braking. With radar-equipped vehicles becoming more common, the presence of radar interference may hinder radar performance. This radar interference may elevate a noise floor during signal processing, which can result in unreliable object detection and tracking.

SUMMARY

This document describes techniques, apparatuses, and systems for multi-channel joint interference mitigation. Radar radiation received by a radar system may include interference from other nearby radar systems. The interference can result in reduced sensitivity of the radar system. The techniques, apparatuses, and systems described herein mitigate the interference by identifying a set of samples of the radar radiation with interference. The interference can be estimated and mitigated by comparing this set (e.g., with interference) to a set of samples without interference and suppressing the interference without suppressing the detected signal. Further, the interference can be analyzed to determine if the interference contains detection information of one or more objects (e.g., other vehicles with radar systems causing interference). In this manner, interference mitigation may be obtained without losing information included in the set of samples including interference.

In one example, a method includes determining, by a processor of a radar system, that interference is present in radar radiation received by the radar system. The method further includes, prior to generating radar data based on the radar radiation, mitigating the interference in the radar radiation by: identifying a first set of samples of the radar radiation without interference; identifying a second set of samples of the radar radiation that includes the interference; estimating the interference in the second set of samples by comparing the first set of samples to the second set of samples; and suppressing, based on the estimating of the interference, the interference in the radar radiation. The method further includes generating, based on the mitigating of the interference in the radar radiation, the radar data. The method further includes outputting the radar data for at least one of detecting or tracking objects in an environment of the radar system.

In another example, a system includes a processor configured to perform this and other methods. This document also describes a computer-readable storage medium comprising instructions that, when executed, configure at least one processor to perform the above-summarized method and other methods set forth herein, in addition to describing systems configured to perform the above-summarized method and the other methods set forth herein.

This Summary introduces simplified concepts related to multi-channel joint interference mitigation, further described in the Detailed Description and Drawings. This Summary is not intended to identify essential features of the claimed subject matter, nor is it intended for use in determining the scope of the claimed subject matter. Although primarily described in the context of mitigating interference among vehicles to reduce false detections and increase sensitivity, the techniques for multi-channel joint interference mitigation can be applied to other applications where mitigating radar interference is desired.

BRIEF DESCRIPTION OF THE DRAWINGS

The details of one or more aspects of multi-channel joint interference mitigation are described in this document with reference to the following figures.

DETAILED DESCRIPTION

Overview

Vehicles equipped with radar systems address radar interference using various techniques. However, many of these techniques have shortcomings. Often, these techniques assume that the interference and the target signals are coming from two different angles. However, in an automotive environment, for example, the interference can come from a target with a radar system. That is, the target signal and the interference are coming from the same angle.

One common technique involves zero-forcing the interference. Zero-forcing sets a magnitude of samples within segments of the signal to zero to eliminate the interference. However, applying a zero magnitude to segments in the samples introduces a gap in the signal. During further radar processing, this gap may introduce spectrum-spreading around strong targets and cause a radar system to introduce false detections, which may increase the processing burden of the radar system.

One example is implemented on a per channel basis, assuming M channels (i.e., M receive antennas). The fast time samples of the $m^{th}$ channel can be modeled using Equation (1):

$$x_m(t) = \begin{cases} s_m(t) + i_m(t) + n_m(t), & t \in T_i \\ s_m(t) + n_m(t), & t \in \bar{T}_i \end{cases} \quad (1)$$

where $s_m(t)$, $i_m(t)$ and $n_m(t)$ are statistically independent components of signal, interference, and noise, respectively. The index set $T_i$ denotes interference duration, while its complement set $\overline{T}_i$ represents duration without interference. Here, $T_i \cup \overline{T}_i$ contains the indexes of the whole samples, while $T_i \cap \overline{T}_i$ is equal to an empty set $\emptyset$. After interference detection and localization, the interference can be zero-forced using Equation (2):

$$\overline{x}_m(t) = \begin{cases} 0, & t \in T_i \\ s_m(t) + n_m(t), & t \in \overline{T}_i \end{cases} \quad (2)$$

That is, all detected interference samples will be forced to zeros, while all signal samples will be output unchanged. However, because this method is implemented on a per channel basis, it does not take advantage of coherent features among the different channels.

Zero-forcing the detected interference can cause phase discontinuity, because radar signals (e.g., for each channel) are zero-forced simultaneously. Correspondingly, there is spectrum spreading around strong targets that can deteriorate the resolution (e.g., weak targets are buried in the spread spectrum) and increase false detections. Additionally, although zero-forcing is easy to implement, it loses the possibility of recovering radar signals at zero-forced positions because it does not utilize spatially coherent features among different channels.

Different methods have been implemented to reduce the adverse effects of zero-forcing. One such method includes approximating missed samples that were zero-forced as interference via inverse transformation of the strongest peaks in the spectrum. A pair of chirp-length-points fast Fourier transformation (FFT) and inverse fast Fourier transformation (IFFT) operations are used to achieve the missed samples approximation for each channel, which increases the computational complexity. The interference mitigation here is, likewise, implemented per channel and, correspondingly, does not take advantage of coherent features among different channels.

Alternatively, non-zero-forcing techniques may also be implemented. For example, a non-zero-forcing technique may use a projection scheme to reject the interference, where the autocorrelation matrix used for the eigen decomposition to generate the projection matrix is calculated by an L trajectory matrix, both rows and columns of which are subseries of the fast time samples. The value of parameter L can be chosen, for example, from 128 to 256. Thus, the computational complexity of eigen-decomposing the auto-correlation matrix can be large. Further, the selection of an appropriate threshold value for interference rejection can be difficult. This method works for individual contaminated time series one by one.

In contrast to these techniques that may involve too much complexity, loss of radar data, or a high false detection rate, multi-channel joint interference mitigation, as described herein, is a more effective and efficient technique to mitigate interference present in a radar signal. The techniques described herein may detect and localize samples of radar radiation contaminated by the interference. The radiation associated with the contaminated samples may include a target signal and interference due to radar energy being emitted by the target. These contaminated samples are compared to uncontaminated samples to estimate the interference. This interference can then be suppressed in the radiation. Additionally, the interference can be analyzed for additional radar data (e.g., additional targets emitting radar energy from different angles).

These techniques may overcome disadvantages of other techniques by using the spatially coherent features among different channels. By projecting out only the contaminated samples from all the samples using the techniques described herein, there may be no phase discontinuity in the projected output. Correspondingly, the noise floor may be lowered, and there may be little to no spectrum spreading to deteriorate resolution and/or increase false detections. Likewise, the computational complexity of multi-channel joint interference mitigation depends on the length of fast time samples and the number of receive antennas. When the quantity of receive channels is small (e.g., M=4), the computational complexity of these techniques may be negligible.

Example Environment

Figure 1:
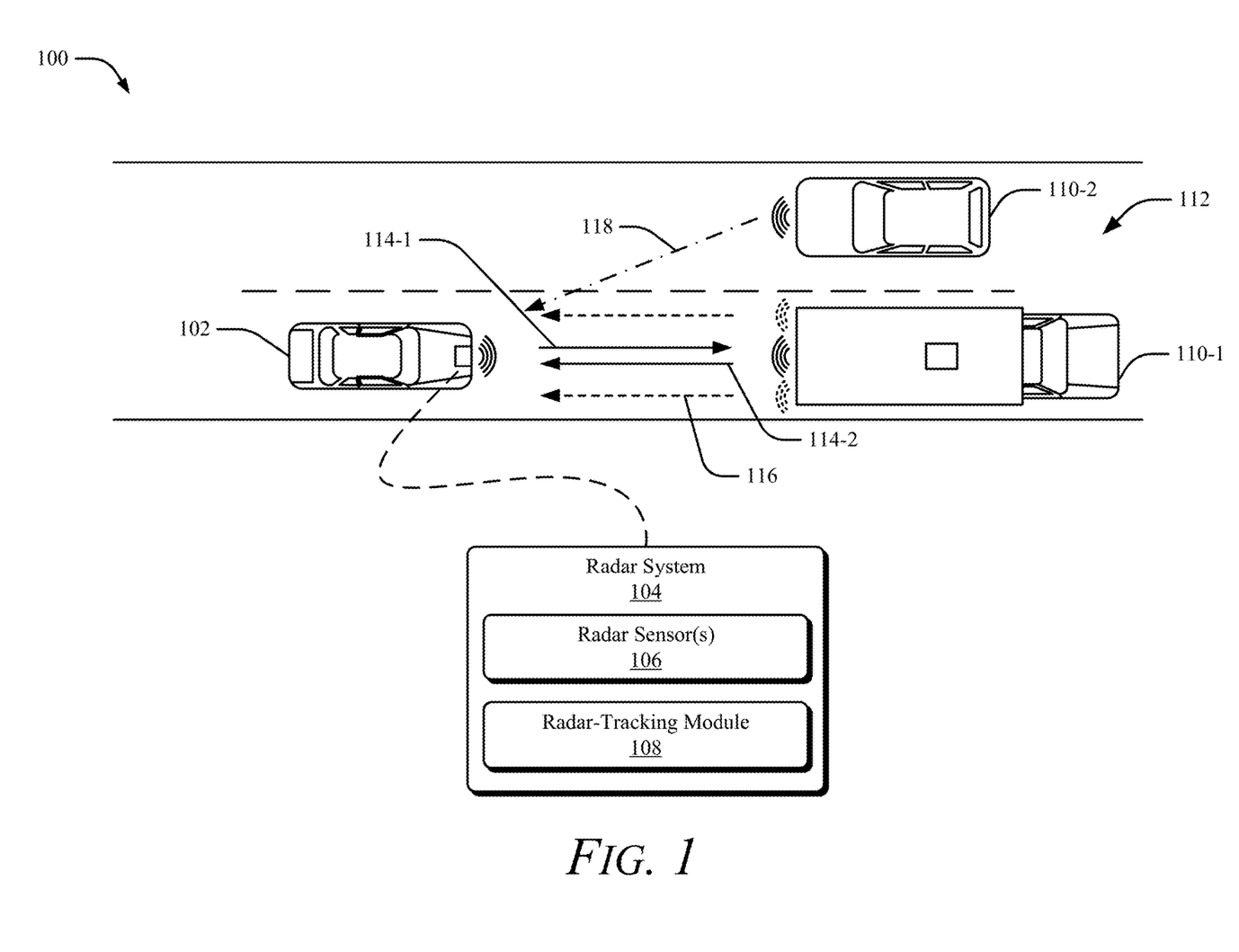
FIG. 1 illustrates an example environment in which multi-channel joint interference mitigation can be applied, in accordance with techniques of this disclosure.

FIG. 1 illustrates an example environment 100 in which multi-channel joint interference mitigation can be applied, in accordance with techniques of this disclosure. A vehicle 102 is equipped with a radar system 104 configured for multi-channel joint interference mitigation. Although depicted as a car, the vehicle 102 can represent other types of vehicles and machinery (e.g., a motorcycle, a bus, a tractor, a semi-trailer truck, watercraft, aircraft, other heavy equipment), including manned and unmanned systems that may be used for a variety of purposes.

The radar system 104 may include one or more radar sensors 106 and a radar-tracking module 108. With the radar sensors 106 specifically located on the vehicle 102, the radar system 104 provides an instrument field-of-view (FOV) that may encompass one or more vehicles 110, including vehicle 110-1 and vehicle 110-2. For example, positioning the radar sensors 106 together can ensure the FOV includes areas above, adjacent to, or on a road 112 on which the vehicle 102 may be traveling. The radar sensors 106 can capture signals from any position on the vehicle 102, including behind or integrated into a side mirror, bumper, roof, or any other part of the vehicle 102, to obtain the desired FOV.

With the radar-tracking module 108, the radar system 104 is configured to detect other vehicles, pedestrians, or other objects traveling on or near the road 112. The radar-tracking module 108 correlates transmitted radar signals 114-1 to received radar signals 114-2 (e.g., received radar radiation) that reflect off a surface of an object, such as the vehicle 110-1. Within the environment 100, other objects may be using radar, including the vehicles 110-1 and 110-2, which may be transmitting radar signals 116 and 118, respectively. The radar system 104 may detect interference to the radar signals 114-2 caused by the radar signals 116 and 118. If relied on for tracking, the interference may cause the radar-tracking module 108 to have difficult tracking and may report inaccurate results.

The radar-tracking module 108 is configured to enable the radar system 104 to mitigate radar interference using multi-channel joint interference mitigation. The radar-tracking module 108 may employ an angle filter to filter out the interference in the received radar radiation (e.g., the radar signals 114-2) and find the angle of the origin of the interference. The radar-tracking module 108 may accomplish this by identifying both a set of samples contaminated by interference and a set of uncontaminated samples. The radar-tracking module 108 can compare (e.g., subtract) the set of contaminated samples and the set of uncontaminated samples to determine the interference and then suppress the interference in the received radar radiation. Further, the angle filter may determine that the interference originates from vehicle 110-1 (e.g., the radar signals 116) and/or vehicle 110-2 (e.g., the radar signals 118). The angles of origination of the interference can be used by the radar-tracking module 108 along with the reflected radar signals 114-2 to identify and track objects in the FOV. Both removing the interference from the radar radiation and retaining the information derived from the interference may enable accurate radar data and reduce false positives detected by the radar system 104.

Example Systems

Figure 2:
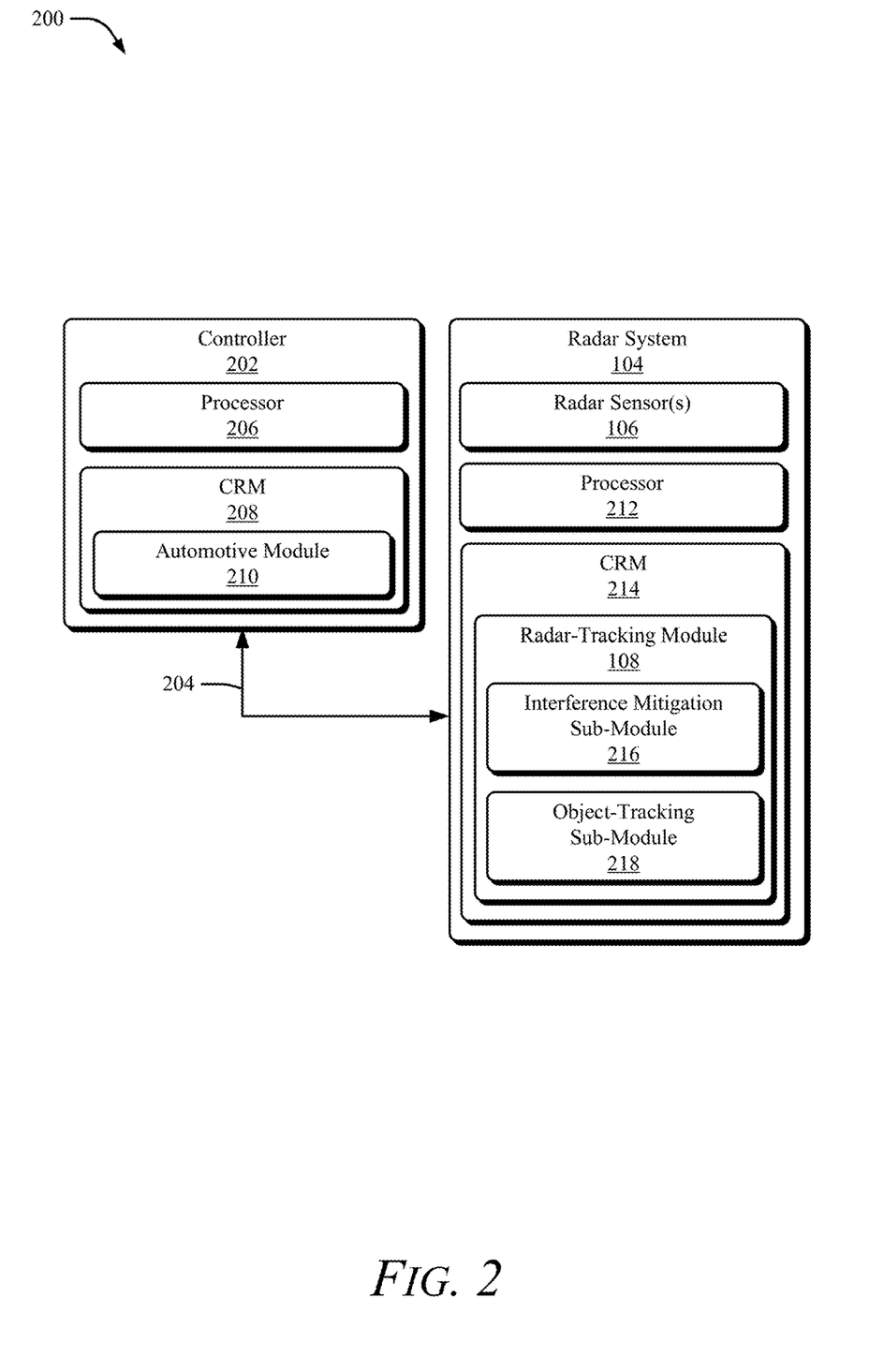
FIG. 2 illustrates an example of an automotive system configured to perform multi-channel joint interference mitigation, in accordance with techniques of this disclosure.

FIG. 2 illustrates an example of an automotive system 200 configured to perform multi-channel joint interference mitigation, in accordance with techniques of this disclosure. The automotive system 200 can be integrated within the vehicle 102 shown in FIG. 1 and is described in that context. For example, the automotive system 200 can include a controller 202 and the radar system 104. The radar system 104 and the controller 202 communicate over a link 204. The link 204 may be a wired or wireless link and, in some cases, includes a communication bus. The controller 202 performs operations based on information received over the link 204, such as an indication of one or more objects traveling on the road 112 from the radar system 104 as objects in the FOV are identified from processing the radar signals 114-2.

The controller 202 includes a processor 206 and a computer-readable storage medium (CRM) 208 (e.g., a memory, long-term storage, short-term storage), which stores instructions for an automotive module 210. The radar system 104 includes the one or more radar sensors 106. The radar system 104 may include processing hardware that includes one or more processors 212 (e.g., a hardware processor, a processing unit) and a CRM 214. The CRM 214 stores instructions associated with the radar-tracking module 108, which may include instructions associated with an interference mitigation sub-module 216 and an object-tracking sub-module 218.

The processors 206 and 212 can be two separate or a single processing unit (e.g., microprocessor, multiple processors in a processing unit) or a pair of or a single system-on-chip of a computing device, a controller, or a control unit. The processors 206 and 212 execute computer-executable instructions stored within the CRMs 208 and 214. As an example, the processor 206 can execute the automotive module 210 to perform a driving function (e.g., an autonomous lane change maneuver, a semi-autonomous lane-keep feature) or other operation of the automotive system 200. Similarly, the processor 212 can execute the radar-tracking module 108, including, executing instructions for implementing the interference mitigation sub-module 216.

The interference mitigation sub-module 216 configures the radar-tracking module 108 to mitigate interference present in the radar signals 114-2 obtained from the radar sensors 106 of the vehicle 102. The interference mitigation sub-module 216 may modify (e.g., preprocess) the radar signals 114-2 before the radar-tracking module 108 can use the radar signals 114-2 to detect objects or perform tracking.

The object-tracking sub-module 218 receives the output from the interference mitigation sub-module 216 and enables the radar-tracking module 108 to infer objects in the FOV based on the preprocessed versions of the radar signals 114-2 provided by the interference mitigation sub-module 216. In response to the object-tracking sub-module 218 detecting and tracking objects determined from these preprocessed versions of the radar signals 114-2, an indication of one or more objects detected by the object-tracking sub-module 218 is output from the radar-tracking module 108

Generally, the automotive system 200 executes the automotive module 210 to perform an automotive function, which may include using output from the radar system 104. The automotive module 210, when executing at the processor 206, can receive the indication of the objects detected by the object-tracking sub-module 218 to enable one or more of these automotive functions.

For example, the automotive module 210 can provide automatic cruise control and monitor the radar system 104 for output that indicates the presence of objects in or near the FOV, for instance, to slow the speed and prevent a rear-end collision with the vehicle 110-1. In such an example, the object-tracking sub-module 218 provides radar-based data as output to the automotive module 210. The radar data is indicative of objects detected or tracked from the preprocessed radar signals 114-2, rather than being based on the radar signals 114-2 as initially received at an antenna of the radar system 104.

The automotive module 210 may provide alerts or perform a specific maneuver when the interference-mitigated radar data obtained from the object-tracking sub-module 218 indicates that one or more objects are in a collision zone around the vehicle 102. By using the preprocessed radar signals 114-2 obtained from the interference mitigation sub-module 216, the object-tracking sub-module 218 may more-accurately detect objects in the collision zone and within the FOV, which may reduce false detections from propagating as misidentified objects resulting from radar interference in a noisy environment, such as a driving scenario with other vehicles operating their own on-board radar systems.

Example Implementations

Figure 3:
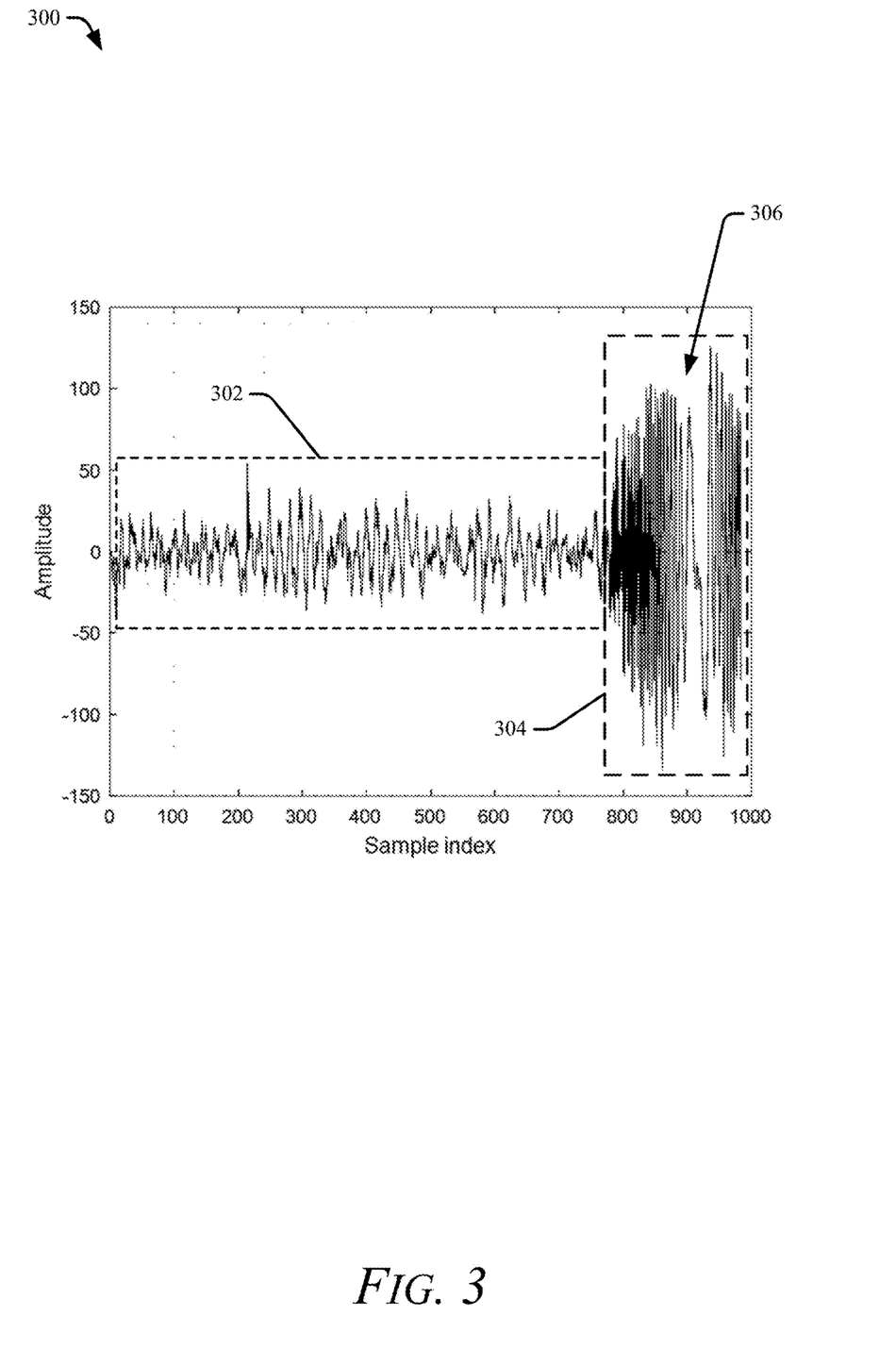
FIG. 3 illustrates an example graph of received radar radiation in which multi-channel joint interference mitigation may be applied, in accordance with techniques of this disclosure.

FIG. 3 illustrates an example graph 300 of received radar radiation in which multi-channel joint interference mitigation may be applied, in accordance with techniques of this disclosure. The graph has dimensions of frequency over a quantity of samples of radar radiation including interference received by a radar system (e.g., the radar system 104) configured to mitigate interference by the techniques described herein.

A first set of samples 302 without interference 306 and a second set of samples 304 that includes the interference 306 are identified. The second set of samples 304 could be a combination of multiple individual sets. The first set of samples 302 and the second set of samples 304 can include a radar signal reflected off an object and noise radiation. The interference 306 may originate from the same object that the radar signal reflects (e.g., the vehicle 110-1 in FIG. 1) and/or other objects (e.g., the vehicle 110-2 in FIG. 1).

The interference 306 can be estimated in the second set of samples 304 by comparing the first set of samples 302 to the second set of samples 304. In one example, this can be accomplished by calculating an interference-signal-noise covariance matrix using Equation (3):

$$\hat{R}_{i+s+n} = \frac{1}{|T_i|}\sum_{t\in T_i} x(t)x^H(t) = \hat{R}_i + \hat{R}_{s|T_i} + \hat{R}_{n|T_i} \quad (3)$$

over the index set $T_i$ and the signal-noise covariance matrix using Equation (4):

$$\hat{R}_{s+n} = \frac{1}{|T_i|} \sum_{t \in T_i} x(t) x^H(t) = \hat{R}_{s|T_i} + \hat{R}_{n|T_i} \quad (4)$$

over the index set $\overline{T}_i$. Here, $x(t) = [x_1(t), \ldots, x_M(t)]^T$ denotes the radar received signal at the $t^{th}$ snapshot. The number of snapshots ($|T_i|$ and $|\overline{T}_i|$) used for the covariance matrix calculation is much larger than the number of channels of the radar system (i.e., $|T_i| \gg M$ and $|\overline{T}_i| \gg M$). For example, the quantity of samples in a chirp (i.e., $|T_i \cup \overline{T}_i|$) can be up to 1024, while the quantity of channels can be, for example, four.

An interference covariance matrix (e.g., the estimated interference) can be determined by subtracting the signal-noise covariance matrix, $\hat{R}_{s+n}$, from the interference-signal-noise covariance, $\hat{R}_{i+s+n}$ using Equation (5):

$$\hat{R}_i = \hat{R}_{i+s+n} - \hat{R}_{s+n}. \quad (5)$$

The interference covariance matrix, $\hat{R}_i$, approaches pure interference (e.g., no noise/estimation error) as both $|T_i| \to \infty$ and $|\overline{T}_i| \to \infty$.

The interference 306 can then be suppressed in the radar radiation received by the radar system. Continuing with the example, a projection matrix, $P_i^{\perp}$, can be constructed by performing an eigen-decomposition of the estimated interference covariance, $\hat{R}_i$, using Equation (6):

$$[V, D] = eig(\hat{R}_i) \quad (6)$$

where D is a diagonal matrix representing the eigenvalues in a descent order and the matrix V contains the corresponding eigenvectors. The number of dominant interference components can be determined by finding the maximum of ratios of neighbor eigenvalues using Equation (7):

$$\max_m \gamma(m) = \left| \frac{d(m)}{d(m+1)} \right|, m = 1, \ldots, M-1 \quad (7)$$

where $d(m)$ is the $m^{th}$ eigenvalue. Besides the maximum ratio criterion, other sophisticated source enumeration methods including Akaike information criterion (AIC), Bayesian Information Criterion (BIC) and Minimum Description Length (MDL), are also applicable to determine the number of dominant interference components. Thus, the projection matrix can be constructed using Equation (8):

$$P_i^{\perp} = I - V(:, 1:m) * V^H(:, 1:m) \quad (8)$$

where I is an identity matrix. Additionally, the number of dominant interference components may relate to a quantity of objects that are sourcing the interference. The angles of origination of the sources of interference are also determined here. This enables the radar system to determine if the object represented in the reflected radar signal is the source of a dominant interference component, and how many other sources of interference there may be.

To avoid phase discontinuity, the projection matrix, $P_i^{\perp}$, can be applied to all the fast time samples $x(t)$ using Equation (9):

$$\hat{x}(t) = P_i^{\perp} x(t), \forall t \in T_i \cup \overline{T}_i \quad (9)$$

There is no signal component in the estimated covariance matrix, $\hat{R}_i$, thus, only the interference component will be projected out (i.e., suppressed). In this manner, the radar system may have less spectrum spreading due to phase discontinuity in the time-domain interference excision. This may lead to higher radar resolution and fewer false detections. Additionally, because the quantity of channels, M, is much smaller than the quantity of fast time samples, $|T_i \cup \overline{T}_i|$, the computational complexity may be reduced to negligible levels.

Example Methods

Figure 4:
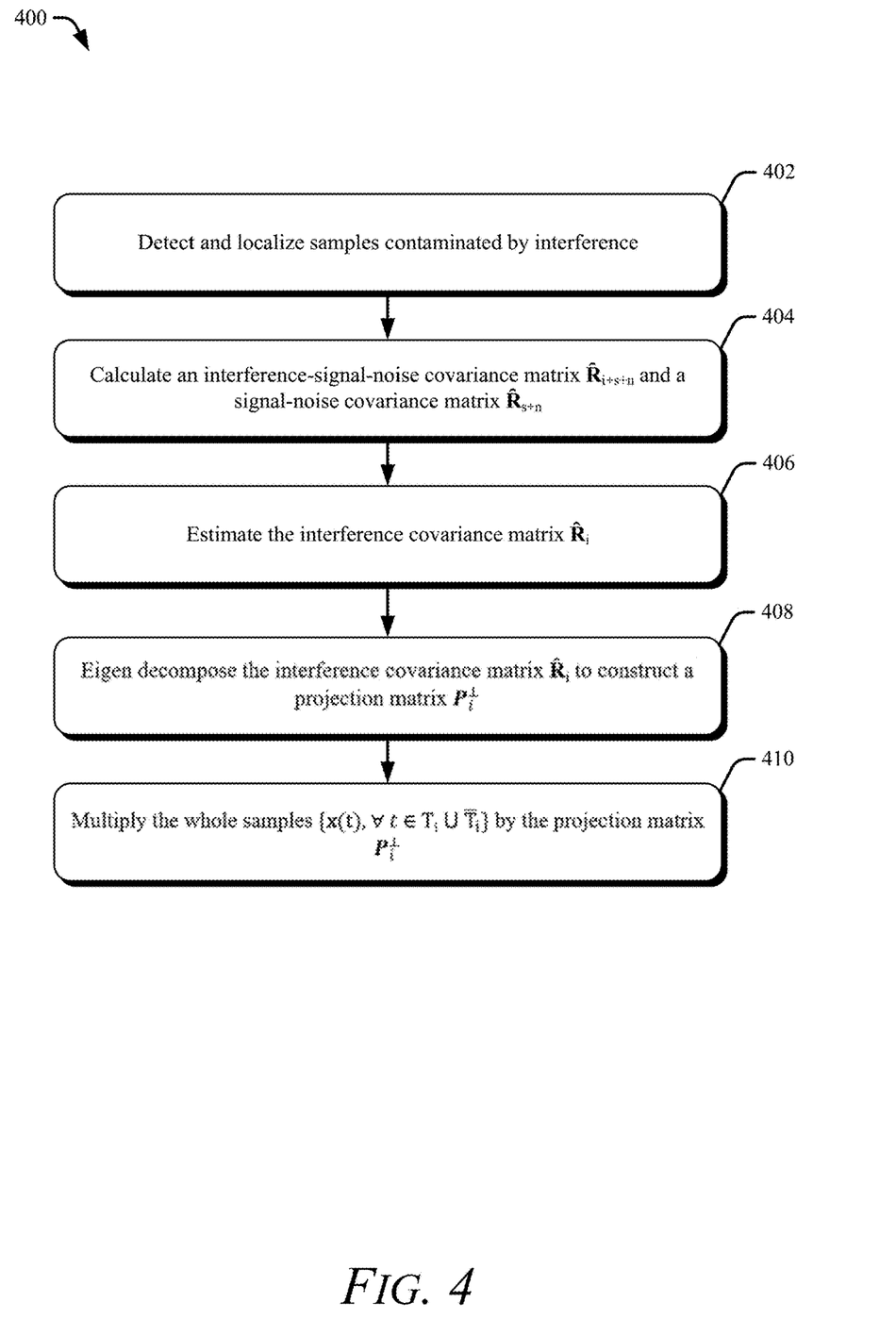
FIG. 4 illustrates an example method for multi-channel joint interference mitigation, in accordance with techniques of this disclosure.

FIG. 4 illustrates an example method 400 for multi-channel joint interference mitigation, in accordance with techniques of this disclosure. At 402, samples contaminated by interference are detected and localized (Equation 1). The radar radiation received by a radar system configured for multi-channel joint interference mitigation may include a radar signal reflected off an object, noise, and/or interference. The interference may be detected by several different techniques. In one non-limiting example, the detection of the interference may be based on amplitudes of the received radar radiation. Amplitudes above a threshold may be considered interference. If interference is detected, the set of samples that include the interference is identified and distinguished from the samples that have no interference.

At 404, an interference-signal-noise covariance matrix and a signal-noise covariance matrix is calculated (Equations 3 and 4, respectively). The interference-signal-noise covariance matrix is based on the contaminated samples, and the signal-noise covariance matrix is based on the uncontaminated samples. The total quantity of samples over time (e.g., contaminated samples and uncontaminated samples combined) may increase and become much larger than the quantity of channels of the radar system and, in turn, may decrease the computational complexity of these calculations down to negligible levels.

At 406, an interference covariance matrix is estimated (Equation 5) by comparing the interference-signal-noise covariance matrix to the signal-noise covariance matrix. The signal and noise components can be subtracted out of the interference-signal-noise covariance leaving just the interference component and estimation error. As more radar radiation is received, the estimation error becomes smaller.

At 408, a projection matrix is constructed based on the eigen-decomposition of the interference covariance matrix (Equations 6 through 8). The number of dominant interference components can be determined during this step, and, based on the angles of origination of the dominant interference components, objects causing the interference (e.g., other vehicles radiating radar energy) can be determined.

At 410, the whole fast time samples of the radar radiation are multiplied by the projection matrix (Equation 9). The result of this calculation is that the interference component in the radar radiation can be projected out leaving only the signal and noise components in the samples of the radar radiation. By projecting the whole samples rather than only the contaminated samples, there may be no phase discontinuity for the projected output. Spectrum spreading may be reduced leading to increased resolution and a decrease in false detections by the radar system.

Figure 5:
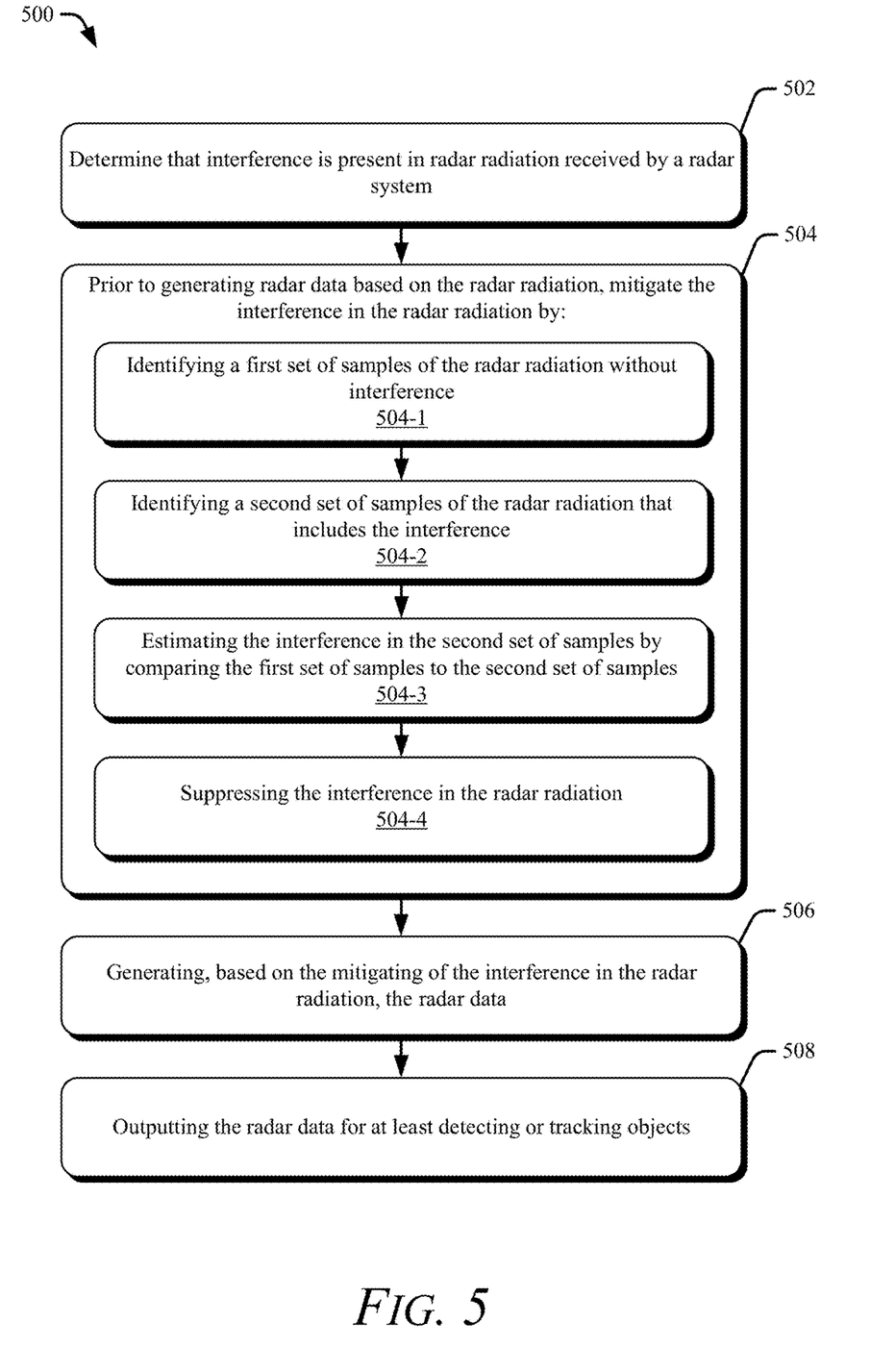
FIG. 5 illustrates an example general method for multi-channel joint interference mitigation, in accordance with techniques of this disclosure.

FIG. 5 illustrates an example general method 500 for multi-channel joint interference mitigation, in accordance with techniques of this disclosure. At 502, interference that is present in radar radiation received by a radar system is determined. The radar system may use different techniques to determine whether the interference is present in the radar radiation. One example technique may involve identifying samples in the radar radiation that have an amplitude above a threshold.

At 504, the interference in the radar radiation is mitigated. The process for mitigating the interference includes several steps. At 504-1, a first set of samples of the radar radiation without interference is identified, and at 504-2, a second set of samples of the radar radiation that includes the interference is identified. In some examples, a signal-noise covariance can be calculated based on the first set of samples, and an interference-signal-covariance matrix can be calculated based on the second set of samples. At 504-3, the interference can be estimated by comparing the first set of samples to the second set of samples. In some examples, the signal-noise covariance matrix can be subtracted from the interference-signal-noise covariance matrix to estimate an interference covariance matrix representing the interference in the radar radiation. At 504-4, the interference in the radar radiation is suppressed. In some examples, an eigen-decomposition of the interference covariance matrix can be performed, and an interference projection matrix can be generated. The interference projection matrix can be applied to the whole fast samples of the radar radiation to project out the interference present in the radar radiation.

At 506, radar data is generated based on the mitigation of the interference present in the radar radiation. Once the preprocessing steps (steps 504-1 through 504-4) are complete, the mitigated radar radiation can be processed to obtain radar data concerning objects in the environment of the radar system. The mitigated radar radiation generated, according to these steps thus far, may reduce spectrum spreading and result in fewer false detections.

At 508, the radar data is outputted for at least detecting and tracking of objects in the environment of the radar system. For example, if the radar system is equipped on a vehicle, the radar data may be used to detect and track objects in the path of the vehicle. Because the radar data may include fewer false detections than radar data generated by traditional means, the radar data may be more accurate and result in a safer user experience for a user of the vehicle.

ADDITIONAL EXAMPLES

Example 1: A method comprising: determining, by a processor of a radar system, that interference is present in radar radiation received by the radar system; prior to generating radar data based on the radar radiation, mitigating the interference in the radar radiation by: identifying a first set of samples of the radar radiation without interference; identifying a second set of samples of the radar radiation that includes the interference; estimating the interference in the second set of samples by comparing the first set of samples to the second set of samples; and suppressing, based on the estimating of the interference, the interference in the radar radiation; generating, based on the mitigating of the interference in the radar radiation, the radar data; and outputting the radar data for at least one of detecting or tracking objects in an environment of the radar system.

Example 2: The method of example 1, wherein the first set of samples and the second set of samples include: a radar signal reflected off an object; and noise radiation.

Example 3: The method of examples 1 or 2, wherein identifying the first set of samples comprises: calculating a signal-noise covariance matrix based on a signal component and a noise component of the radar radiation; and calculating an interference-signal-noise covariance matrix based on a signal component, an interference component, and a noise component of the radar radiation.

Example 4: The method of any one of the preceding examples, wherein estimating the interference in the second set of samples comprises: estimating an interference covariance matrix by comparing the signal-noise covariance matrix to the interference-signal-noise covariance matrix.

Example 5: The method of any one of the preceding examples, further comprising: determining one or more angles of origination of the interference to identify one or more sources of the interference.

Example 6: The method of any one of the preceding examples, wherein determining one or more angles of origin of the interference comprises: performing an eigen-decomposition on the interference covariance matrix to determine a quantity of dominant interference components in the interference.

Example 7: The method of any one of the preceding examples, wherein suppressing the interference comprises: constructing, based on performing the eigen-decomposition on the interference covariance matrix, an interference projection matrix; and applying the interference projection matrix to the radar radiation to remove the interference from the radar radiation.

Example 8: A system comprising: one or more processors configured to: determine, by a processor of a radar system, that interference is present in radar radiation received by the radar system; prior to generating radar data based on the radar radiation, mitigate the interference present in the radar radiation by: identifying a first set of samples of the radar radiation without interference; identifying a second set of samples of the radar radiation that comprises the interference; estimating the interference in the second set of samples by comparing the first set of samples to the second set of samples; suppressing, based on estimating the interference, the interference in the radar radiation; generate, based on the mitigated radar radiation, the radar data; and output the radar data for at least detecting or tracking of objects in an environment of the radar system.

Example 9: The system of example 8, wherein the first set of samples and the second set of samples include: a radar signal reflected off an object; and noise radiation.

Example 10: The system of examples 8 or 9, wherein the one or more processors are configured to identify the first set of samples by at least: calculating a signal-noise covariance matrix that includes a signal component and a noise component of the radar radiation; and calculating an interference-signal-noise covariance matrix that includes a signal component, an interference component, and a noise component of the radar radiation.

Example 11: The system of any one of the preceding examples, wherein the one or more processors are configured to estimate the interference in the second set of samples by at least: estimating an interference covariance matrix by comparing the signal-noise covariance matrix to the interference-signal-noise covariance matrix.

Example 12: The system of any one of the preceding examples, wherein the one or more processors are further configured to: determining one or more angles of origination of the interference to identify one or more sources of the interference.

Example 13: The system of any one of the preceding examples, wherein the one or more processors are configured to analyze the interference for radar detections by at least: performing an eigen-decomposition on the interference covariance matrix to determine a quantity of dominant interference components in the interference.

Example 14: The system of any one of the preceding examples, wherein the one or more processors are configured to suppress the interference by at least: constructing, based on performing the eigen-decomposition on the interference covariance matrix, an interference projection matrix; and applying the interference projection matrix to the radar radiation to remove the interference from the radar radiation.

Example 15: A computer-readable storage media comprising instructions that, when executed, configure at least one processor to: determine, by a processor of a radar system, that interference is present in radar radiation received by the radar system; prior to generating radar data based on the radar radiation, mitigate the interference present in the radar radiation by: identifying a first set of samples of the radar radiation without interference; identifying a second set of samples of the radar radiation that comprises the interference; estimating the interference in the second set of samples by comparing the first set of samples to the second set of samples; suppressing, based on estimating the interference, the interference in the radar radiation; generate, based on the mitigated radar radiation, the radar data; and output the radar data for at least detecting or tracking of objects in an environment of the radar system.

Example 16: The computer-readable storage media of example 15, wherein the instructions further configure the at least one processor to identify the first set of samples by at least: calculating a signal-noise covariance matrix based on a signal component and a noise component of the radar radiation; and calculating an interference-signal-noise covariance matrix based on a signal component, an interference component, and a noise component of the radar radiation.

Example 17: The computer-readable storage media of any one of the preceding examples, wherein the instructions further configure the at least one processor to estimate the interference in the second set of samples by at least: estimating an interference covariance matrix by comparing the signal-noise covariance matrix to the interference-signal-noise covariance matrix.

Example 18: The computer-readable storage media of any one of the preceding examples, wherein the instructions are further configured to: determine one or more angles of origination of the interference to identify one or more sources of the interference.

Example 19: The computer-readable storage media of any one of the preceding examples, wherein the instructions are further configured to determine one or more angles of origin of the interference by at least: performing an eigen-decomposition on the interference covariance matrix to determine a quantity of dominant interference components in the interference.

Example 20: The computer-readable storage media of any one of the preceding examples, wherein the instructions are further configured to suppress the interference by at least: constructing, based on performing the eigen-decomposition on the interference covariance matrix, an interference projection matrix; and applying the interference projection matrix to the radar radiation to remove the interference from the radar radiation.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with radar interference mitigation can occur in other systems. Therefore, although described as a way to improve radar interference mitigation in vehicle-based radars, the techniques of the foregoing description can be applied to other systems that need to mitigate electromagnetic interference. Additionally, the techniques herein have been described in the context of digital signal processing. Theoretically, similar techniques can be applied using analog signal processing.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method of performing multi-channel joint interference mitigation, the method comprising:
   determining, by a processor of a radar system, that multi-channel joint interference is present in a radar radiation received by a plurality of receive channels of the radar system;
   prior to generating radar data based on the radar radiation, mitigating the multi-channel joint interference in the radar radiation by:
      identifying, from first receive channels of the plurality of receive channels, a first set of samples of the radar radiation without interference;
      identifying, from second receive channels of the plurality of receive channels different from the first receive channels, a second set of samples of the radar radiation that includes the interference;
      estimating the interference in the second set of samples by comparing the first set of samples to the second set of samples; and
      suppressing, based on the estimating of the interference, the interference in the second set of samples;
   generating, based on the mitigating of the multi-channel joint interference in the radar radiation, the radar data; and
   outputting the radar data for at least one of detecting or tracking objects in an environment of the radar system.

2. The method of claim 1, wherein the first set of samples and the second set of samples include:
   a radar signal reflected off an object; and
   noise radiation.

3. The method of claim 2, wherein identifying the first set of samples comprises:
   calculating a signal-noise covariance matrix based on a signal component and a noise component of the radar radiation; and
   calculating an interference-signal-noise covariance matrix based on a signal component, an interference component, and a noise component of the radar radiation.

4. The method of claim 3, wherein estimating the interference in the second set of samples comprises:
   estimating an interference covariance matrix by comparing the signal-noise covariance matrix to the interference-signal-noise covariance matrix.

5. The method of claim 4, further comprising:
determining one or more angles of origination of the interference to identify one or more sources of the interference.

6. The method of claim 5, wherein determining one or more angles of origin of the interference comprises:
performing an eigen-decomposition on the interference covariance matrix to determine a quantity of dominant interference components in the interference.

7. The method of claim 6, wherein suppressing the interference comprises:
constructing, based on performing the eigen-decomposition on the interference covariance matrix, an interference projection matrix; and
applying the interference projection matrix to the radar radiation to remove the interference from the radar radiation.

8. A radar system comprising:
one or more processors configured to:
determine that multi-channel joint interference is present in a radar radiation received by a plurality of receive channels of the radar system;
prior to generating radar data based on the radar radiation, mitigate the multi-channel joint interference present in the radar radiation by:
identifying, from first receive channels of the plurality of receive channels, a first set of samples of the radar radiation without interference;
identifying, from second receive channels of the plurality of receive channels different from the first receive channels, a second set of samples of the radar radiation that comprises the interference;
estimating the interference in the second set of samples by comparing the first set of samples to the second set of samples;
suppressing, based on estimating the interference, the interference in the second set of samples;
generate, based on the mitigated mitigation of the multi-channel joint interference in the radar radiation, the radar data; and
output the radar data for at least detecting or tracking of objects in an environment of the radar system.

9. The radar system of claim 8, wherein the first set of samples and the second set of samples include:
a radar signal reflected off an object; and
noise radiation.

10. The radar system of claim 9, wherein the one or more processors are configured to identify the first set of samples by at least:
calculating a signal-noise covariance matrix that includes a signal component and a noise component of the radar radiation; and
calculating an interference-signal-noise covariance matrix that includes a signal component, an interference component, and a noise component of the radar radiation.

11. The radar system of claim 10, wherein the one or more processors are configured to estimate the interference in the second set of samples by at least:
estimating an interference covariance matrix by comparing the signal-noise covariance matrix to the interference-signal-noise covariance matrix.

12. The radar system of claim 11, wherein the one or more processors are further configured to:
determining one or more angles of origination of the interference to identify one or more sources of the interference.

13. The radar system of claim 12, wherein the one or more processors are configured to analyze the interference for radar detections by at least:
performing an eigen-decomposition on the interference covariance matrix to determine a quantity of dominant interference components in the interference.

14. The radar system of claim 13, wherein the one or more processors are configured to suppress the interference by at least:
constructing, based on performing the eigen-decomposition on the interference covariance matrix, an interference projection matrix; and
applying the interference projection matrix to the radar radiation to remove the interference from the radar radiation.

15. A non-transitory computer-readable storage media comprising instructions that, when executed, configure at least one processor of a radar system to:
determine that multi-channel joint interference is present in a radar radiation received by a plurality of receive channels of the radar system;
prior to generating radar data based on the radar radiation, mitigate the multi-channel joint interference present in the radar radiation by:
identifying, from first receive channels of the plurality of receive channels, a first set of samples of the radar radiation without interference;
identifying, from second receive channels of the plurality of receive channels different from the first receive channels, a second set of samples of the radar radiation that comprises the interference;
estimating the interference in the second set of samples by comparing the first set of samples to the second set of samples;
suppressing, based on estimating the interference, the interference in the second set of samples;
generate, based on the mitigation of the multi-channel joint interference in the radar radiation, the radar data; and
output the radar data for at least detecting or tracking of objects in an environment of the radar system.

16. The non-transitory computer-readable storage media of claim 15, wherein the instructions further configure the at least one processor to identify the first set of samples by at least:
calculating a signal-noise covariance matrix based on a signal component and a noise component of the radar radiation; and
calculating an interference-signal-noise covariance matrix based on a signal component, an interference component, and a noise component of the radar radiation.

17. The non-transitory computer-readable storage media of claim 16, wherein the instructions further configure the at least one processor to estimate the interference in the second set of samples by at least:
estimating an interference covariance matrix by comparing the signal-noise covariance matrix to the interference-signal-noise covariance matrix.

18. The non-transitory computer-readable storage media of claim 17, wherein the instructions are further configured to:
determine one or more angles of origination of the interference to identify one or more sources of the interference.

19. The non-transitory computer-readable storage media of claim 18, wherein the instructions are further configured to determine one or more angles of origin of the interference by at least:
  performing an eigen-decomposition on the interference covariance matrix to determine a quantity of dominant interference components in the interference.

20. The non-transitory computer-readable storage media of claim 19, wherein the instructions are further configured to suppress the interference by at least:
  constructing, based on performing the eigen-decomposition on the interference covariance matrix, an interference projection matrix; and
  applying the interference projection matrix to the radar radiation to remove the interference from the radar radiation.

\* \* \* \* \*